United States Patent [19]
Calcerano et al.

[11] Patent Number: 5,291,396
[45] Date of Patent: Mar. 1, 1994

[54] METHOD OF ORDERING, SHIPPING AND MERCHANDISING GOODS AND SHIPPING/DISPLAY ASSEMBLY THEREFOR

[75] Inventors: Victor Calcerano, Carmel, N.Y.; Joseph T. Ricci, Bethel, Conn.

[73] Assignee: Duracell Inc., Bethel, Conn.

[21] Appl. No.: 819,034

[22] Filed: Jan. 10, 1992

[51] Int. Cl.$^5$ .................. G06F 15/22; G06F 15/24; G06G 7/52
[52] U.S. Cl. ................... 364/401; 206/44 R; 206/45.11; 206/45.18
[58] Field of Search ............. 364/401, 403; 206/333, 206/44 R, 44.12, 45.11, 45.18

[56] References Cited

U.S. PATENT DOCUMENTS

| | | | |
|---|---|---|---|
| 4,191,288 | 3/1980 | Hostad | 206/44 R |
| 4,667,827 | 5/1987 | Calcerano | 206/461 |
| 4,799,156 | 1/1989 | Shavit et al. | 364/401 |
| 4,825,624 | 5/1989 | Calcerano | 53/442 |
| 4,828,133 | 5/1989 | Hougendobler | 206/44 R |
| 4,896,770 | 1/1990 | Calcerano et al. | 206/333 |
| 4,938,352 | 7/1990 | Calcerano et al. | 206/333 |
| 4,958,731 | 9/1990 | Calcerano | 206/333 |
| 4,961,533 | 10/1990 | Teller et al. | 364/403 |
| 4,984,155 | 1/1991 | Geier et al. | 364/401 |
| 5,038,283 | 8/1991 | Caveney | 364/401 |

Primary Examiner—Donald E. McElheny, Jr.
Assistant Examiner—Laura Brutman
Attorney, Agent, or Firm—Ronald S. Cornell; James B. McVeigh; Barry D. Josephs

[57] ABSTRACT

Goods which come in different sizes, shapes, numbers, etc. are packed in assemblies which comprise a tray and a plurality of open-top box-like modules which sit snugly side-by-side in the tray. Each module is prepacked and contains only one size, shape, etc. goods. At its destination the loaded assembly, usually along with other loaded assemblies, becomes the display package for the different size, shape, etc. goods. The method of the invention utilizes a lap-top computer working with a mainframe by which the order is placed and immediately gives pricing information. In the case of a custom or tailored order of different numbers of various sizes of goods, the computer is able to indicate whether the order will make up a complete shipment of packing assemblies, with the correct number of prefilled modules to fill the trays with none left over.

9 Claims, 4 Drawing Sheets

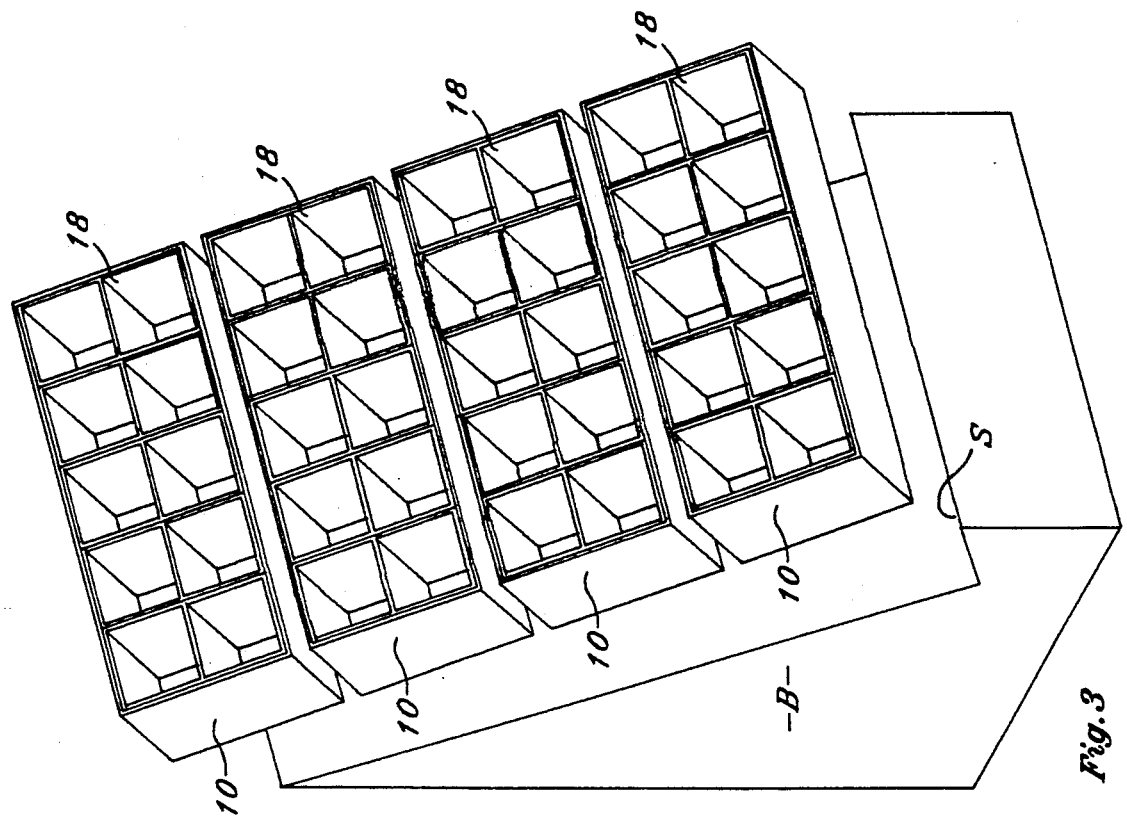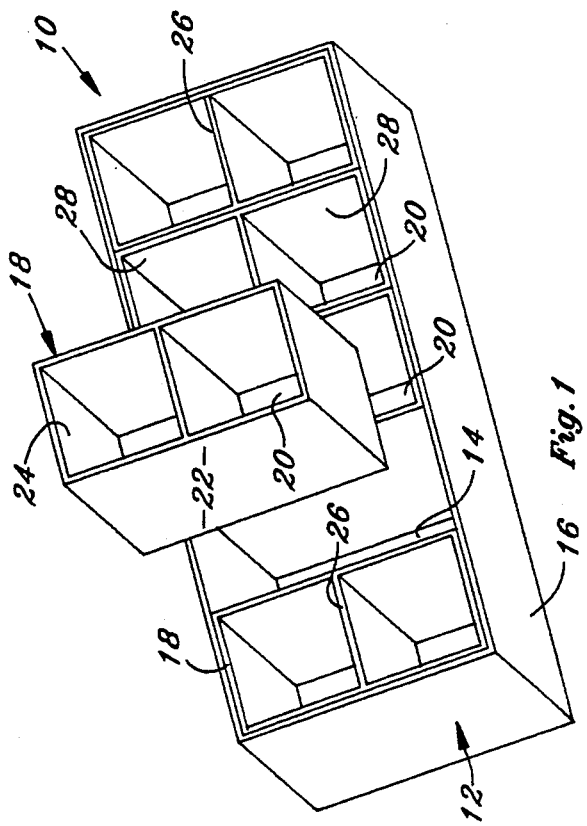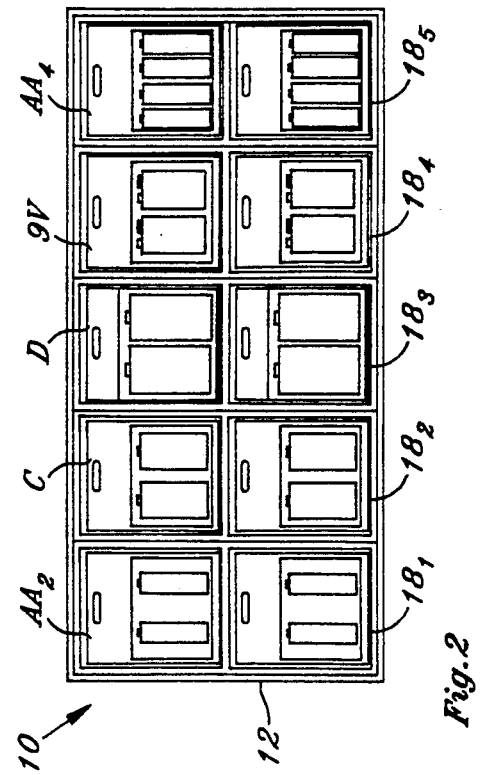

MAINFRAME PROCESSING

METHOD OF ORDERING, SHIPPING AND MERCHANDISING GOODS AND SHIPPING/DISPLAY ASSEMBLY THEREFOR

BACKGROUND OF THE INVENTION

1. Field of the Invention

This invention relates to a method of ordering, shipping and merchandising packaged goods, which come in various sizes, shapes and numbers (for instance, blister card dry cell battery packages of different sizes and numbers of batteries). Still more specifically, the invention relates to such a method which minimizes the amount of packing and maximizes flexibility so that the retailer may economically order a wide variety of combinations of such packages. At the same time, the invention involves the packing assembly used with the method and which readily serves as a display container for floor displays or pallet displays of the goods.

Applying the invention to dry cell batteries to better illustrate it, retailers of dry cell batteries must offer their customers the choice of batteries of various sizes, i.e. "D", "C", "AA", "AAA", "9 Volt", etc. The customers of these retailers, as is well known, need different batteries for a wide variety of uses. For instance, a hunter's flashlight will carry two or more "D" size batteries; a portable radio/cassette player may carry four "AAA" batteries; a smoke detector may require a 9 Volt battery, etc.

The retailer's stock will ideally, of course, reflect his customer's needs. These needs will be different. For instance, a retailer in a city may require a large number of "AAA" batteries for his customers' "Walkman" electronic devices, while a rural retailer might have more of a call for portable lighting for power outages and which might use "D", "C", "AA". Thus, the battery salesman, when he calls on his retailers, will take various factors into consideration in predicting the needs of the retailer, and the retailer himself may have a good idea of what his future stock should be.

At the same time, both the salesman and the retailer are concerned that all available sizes of batteries be placed on display with a minimum of stockperson's time and a minimum of fuss and wastemaking.

2. Description of Related Art including Information Disclosed under §§1.97 to 1.99

In my U.S. Pat. No. 4,825,624 assigned to my assignee, there is disclosed a meritorious method by which a shipping container has three compartments all containing one variety or size of battery in blister card display. Each side of the containers of this patent has a flap. The containers are separately filled, the flaps are closed and taped and the containers are separately shipped to a destination.

At the destination the shipping containers of my earlier patent are all opened and their flaps downturned. They are then placed together in an open-top box thus forming a promotional display without having to individually transfer the blister cards at the place of assembly.

SUMMARY OF THE INVENTION

As meritorious as the earlier invention is, the present invention may be thought of as an improvement on the invention of my earlier patent. Referring first to the packing/shipping/display assembly, the present invention involves a plurality of open-top modules which sit side-by-side in a tray. Rather than using three compartments as disclosed in the shipping containers of my earlier invention, I improve flexibility by reducing the size of the modules to the "lowest common denominator", having in mind what works well from the standpoint of ease of handling and number of packages and products in a given module. I have found that in the optimum embodiments, the length of the module is preferably only twice the width and the module is divided into two equal compartments. Both compartments of each module are preloaded with packages of the same type items in every case. Preferably, there are five modules sitting in the tray in every case, the contents of the modules differing depending on the items desired by the customers.

The method involving the present assembly optimizes efficiency further by utilizing a computer and starts out by entering the request into the system. Thereafter, the computer displays the pertinent pricing and the configuration of different prepacked modules which will comprise the order. In the case of a non-standard order, the computer will advise whether it contains the proper number of packages (for instance, blister cards) and modules so that the trays are all full of the prescribed number of modules with no modules left over and each module contains the prescribed number of packages with none left over. The order is assembled and shipped to the customer, the customer using the module/tray assembly as a merchandising exhibit.

BRIEF DESCRIPTION OF THE DRAWINGS

Further features and advantages of the present invention will be discussed with reference to the drawings in which:

FIG. 1 is a perspective view partly exploded of a shipping tray containing some empty modules and embodying the invention;

FIG. 2 is a top plan view of a loaded shipping tray and modules;

FIG. 3 is an exploded perspective view slightly reduced showing a number of shipping trays stacked in a floor display, the upper shipping trays containing empty modules, the lower shipping trays containing no modules;

DESCRIPTION OF THE PREFERRED ASSEMBLY OF THE INVENTION

Figure 5:
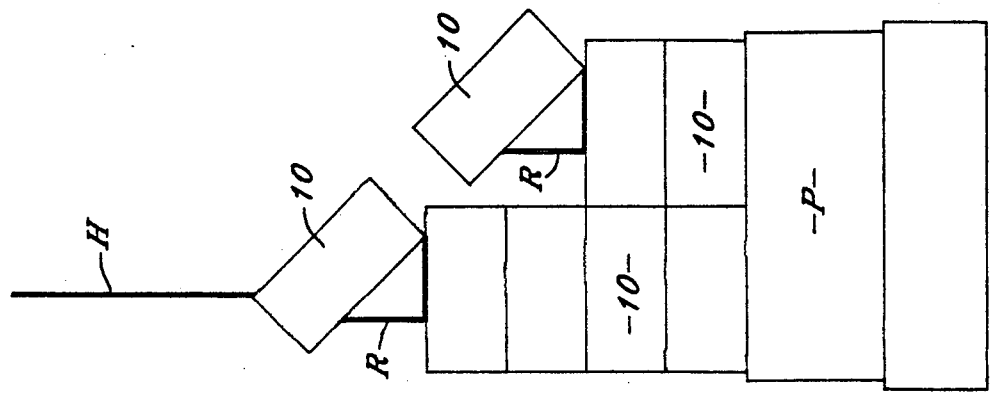
FIG. 5 is a side view of the display of FIG. 4, slightly reduced.

The packing assembly embodying the invention is generally designated 10 in FIG. 1. It comprises a rectangular shipping tray 12 including a bottom wall 14 and a side wall 16 extending upward about the periphery of the bottom wall.

Modules 18 preferably five in number, are disposed snugly side-by-side inside the tray and are collectively embraced by the side wall 16. Each of the modules is an open-top box comprising a bottom wall 20, side walls 22 and end walls 24 and an internal divider 26 secured across between the mid-point of the side walls 22 and dividing the module into two compartments 28.

FIG. 2 shows the tray 12 and the modules 18 prepacked with blister card dry cell battery packages. Both compartments of each of the modules are loaded with blister cards containing the same sizes and numbers of batteries. Thus, module $18_3$ contains in each of its two compartments blister cards containing size "D" batteries, while module $18_4$ contains 9 Volt batteries in blister cards as indicated, and so on.

The modules are packed uniformly; for example, each "D" module contains 6 "D" blister cards containing two "D" batteries each.

Each "2-AA" module contains 14 "2-AA" blister cards containing two "AA" batteries each. Each "4-AA" module contains 14 "4-AA" blister cards containing four "AA" batteries each and so on.

As stated in the summary of the invention, the assembly including the tray 12 and the five two-compartment modules 18 is the shipping container. They are also the display container when the assembly reaches its destination. The module 18 can be fabricated from any of the materials commonly used in the packaging art. Such materials include corrugated cardboard, heavy paperboard, corrugated plastic, molded plastic and thermoformed plastic. The plastic materials are generally more rugged but also more expensive and would have to be reused to be cost effective. It is generally desirable that the modules be disposable whereby reshipping costs are avoided.

Thus, it is preferred to fabricate the modules from a cheaper material such as corrugated cardboard or heavy paperboard. Corrugated cardboard is the most preferred material because it has a greater inherent strength than heavy paperboard. Of the corrugated cardboards, flute corrugated cardboard is the most preferred because this material makes it easier to mechanically form and glue the module together from a single piece of cardboard. It is desirable to fabricate the module from a single piece of cardboard because this makes it easier to mechanically assemble the module. Similarly, the shipping tray may be of corrugated cardboard, preferably from a single piece whose blank provides interlocking corners used in assembly.

It can be seen (FIG. 3) that a plurality of loaded tray/module assemblies 10 can be stacked on a base B having an inclined surface S at the retailer's to provide an attractive floor display. While the modules are shown empty in FIG. 3, when the modules are loaded, the transparent housings of the blister cards show all the batteries available.

Figure 4:
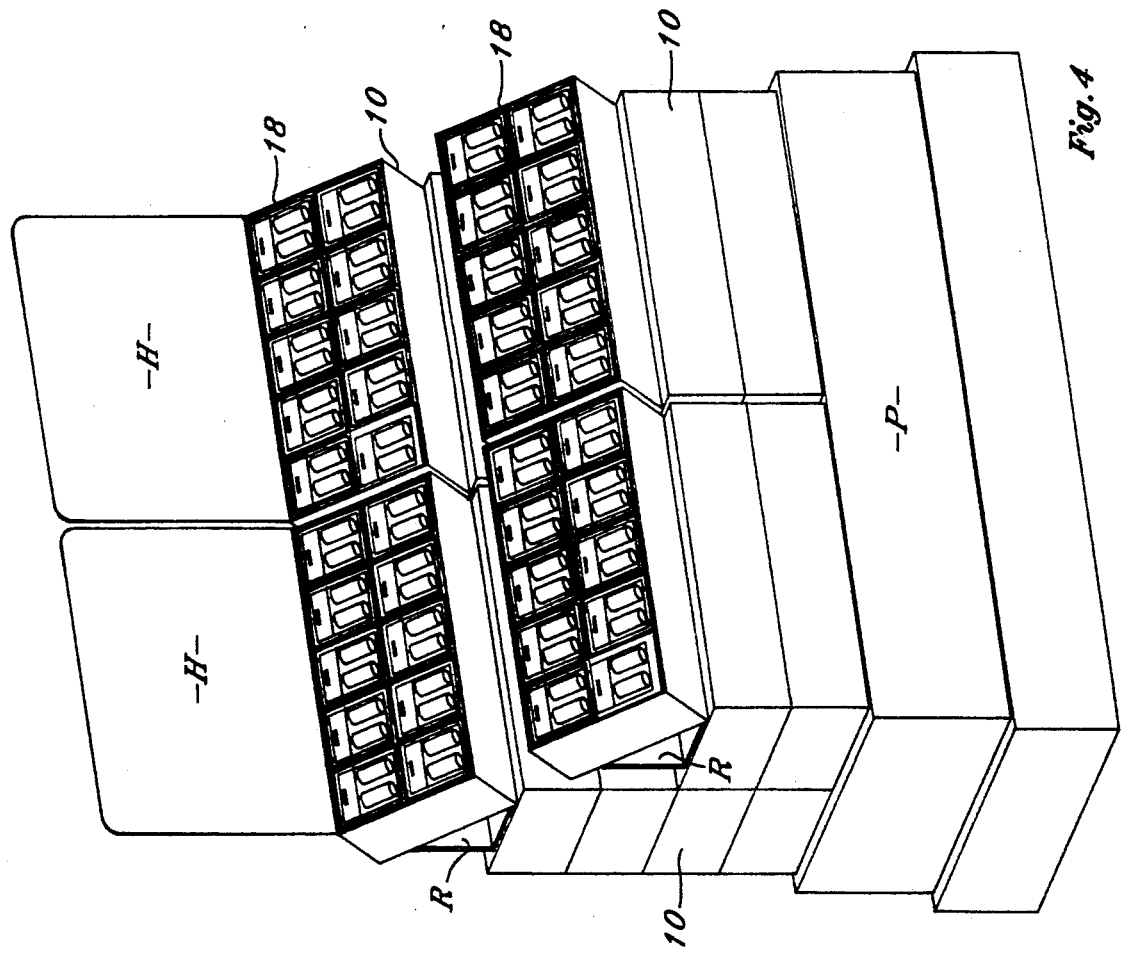
FIG. 4 is a pallet display comprising a number of assemblies embodying the invention.

FIG. 4 shows a plurality of tray/module assemblies organized in the form of a pallet display. Note that the assemblies 10 are stacked on a shrouded pallet base P and that the four front assemblies are removed and supported on appropriate wedge-like racks R for more convenient, attractive viewing. A display loader may be tucked into the upper of the assemblies 10 between the modules and their tray for vertical disposition and display of graphics.

It should be understood that the assemblies comprising the tray and module arrive at their display destination in corrugated outer boxes in the case of a floor display as in FIG. 3 or covered only by the plastic shrink wrap in the case of a pallet shipment, the wrap being stripped off to give free access to the contents of the shipment. In each case there is no need for the stockperson to handle the blister cards or transfer them from the modules in any way.

METHOD OF THE INVENTION

By having modules of relatively small size containing a relatively small number of packages, there is achieved a high degree of flexibility in combinations of items such as dry cell batteries to be contained in a given tray/module assembly and in a given order comprising a number of such assemblies. For instance, it may be that a retailer would want only, say, six blister card packages of "D" batteries and the remainder "AAA" batteries. This can be achieved by having only one module 18 contain the "D" battery packages with the other modules containing "AAA". It may be that the retailer would want one of the five modules filled with "AA" batteries, and the order could be entered and filled accordingly, and so on.

To maximize this great flexibility in filling the tray/module assembly and corresponding flexibility in the ordering, shipping and display, the invention contemplates the use of a computer system to assist in determining the configuration of the modules and assemblies.

In almost every case the salesperson will sit down with his account, that is, his customer, and determine what it is that the customer should be ordering to meet the demands of his retail customers. Experience has shown that an order of a number of batteries of each of several different sizes will be in one of three categories, or "tiers".

The first category comprises standard prepacked assemblies, for instance a "three-tray prepack" of 15 modules containing different quantities of the various sizes of batteries in a configuration or combination known to be suitable for a wide variety of retailers. For instance, a "three-tray prepackage" containing 15 modules might have the combination of 56 "AA" cards (containing 4 "AA" batteries per card); 40 "C" cards (containing 2 batteries each); 30 "D" cards (containing 2 batteries each); and 12 "9V" battery cards (containing one battery each). "First tier" prepacks would be already made and at the local distributor.

In the second category, or "tier", there are configurations which are not necessarily pre-assembled and in stock but which are known to "work" in special retail situations, for instance, drug stores.

The salesperson calling on the account has available a sales book indicating the catalog number for shipments in the first and second categories, or "tiers", above.

The final category, or third "tier", is a tailor-made category probably never before ordered up but designed for a particular customer for a particular reason.

The salesperson calling on his account and has with him, as well as his book, a lap-top computer programmed to enter orders on the basis of the modular prepacked system outlined above. In the memory of the computer there is information including pricing, weights and the number of a given size battery in each prepacked module.

Figure 6:
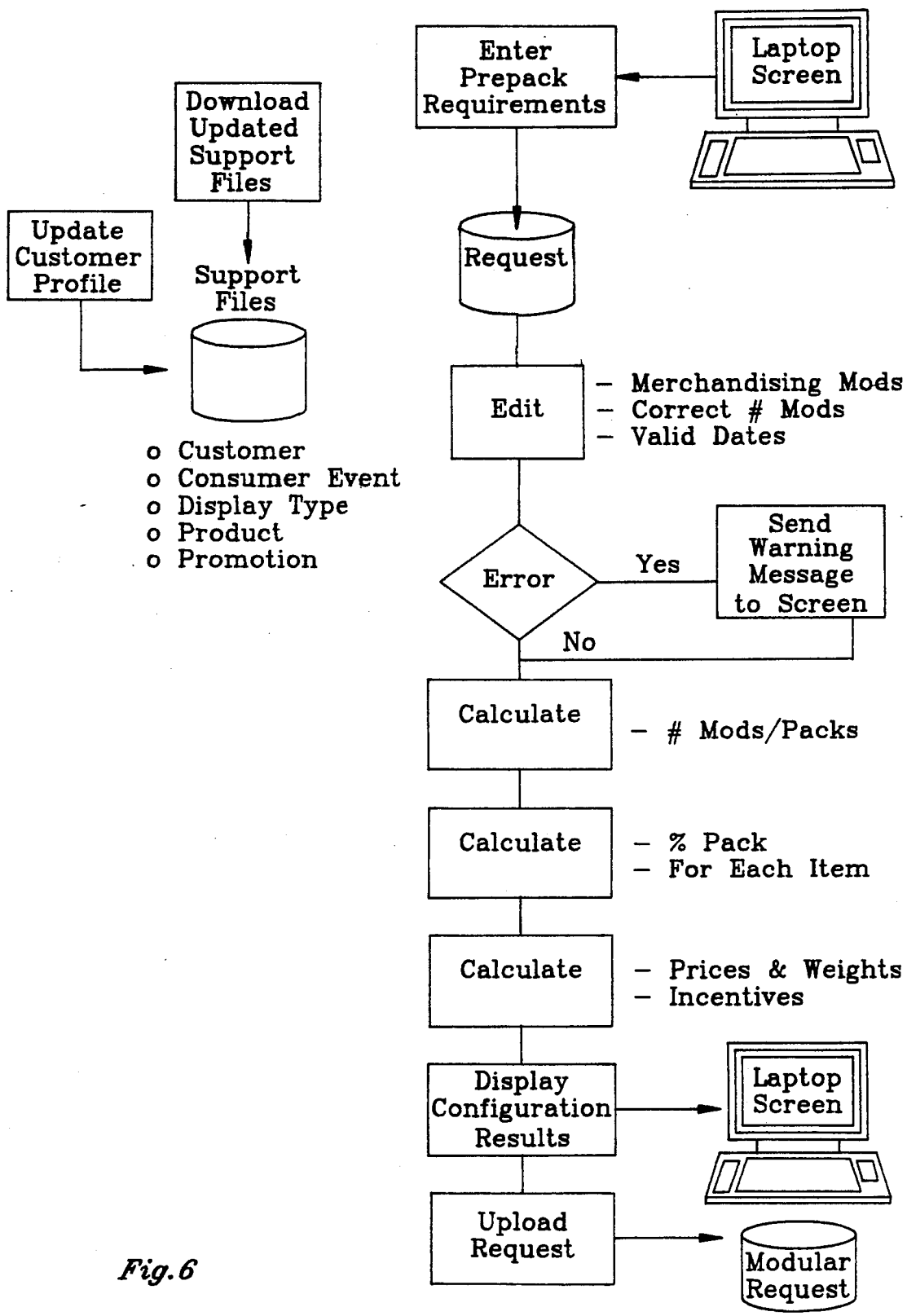
FIG. 6 is a flow chart illustrating the method steps of the present invention accomplished in the salesperson's lap-top computer.

As shown symbolically in FIG. 6, in the case of the first two categories, or "tiers", of orders outlined above, the salesperson enters the catalog number indicating the prepacked configuration. This catalog number having been entered, and because it is already programmed to do so, the computer will display the number of modules and assemblies, the number of blister cards for each of the separate sizes of product, the prices and the weights and any incentives which apply and will display the configuration and all of the results of this computation, all of such information being retrieved or computed from information in the lap-top computer. Because the two categories of configurations are prepacked, items for which the number of modules and packs is already known would be an existing configuration.

Figure 7:
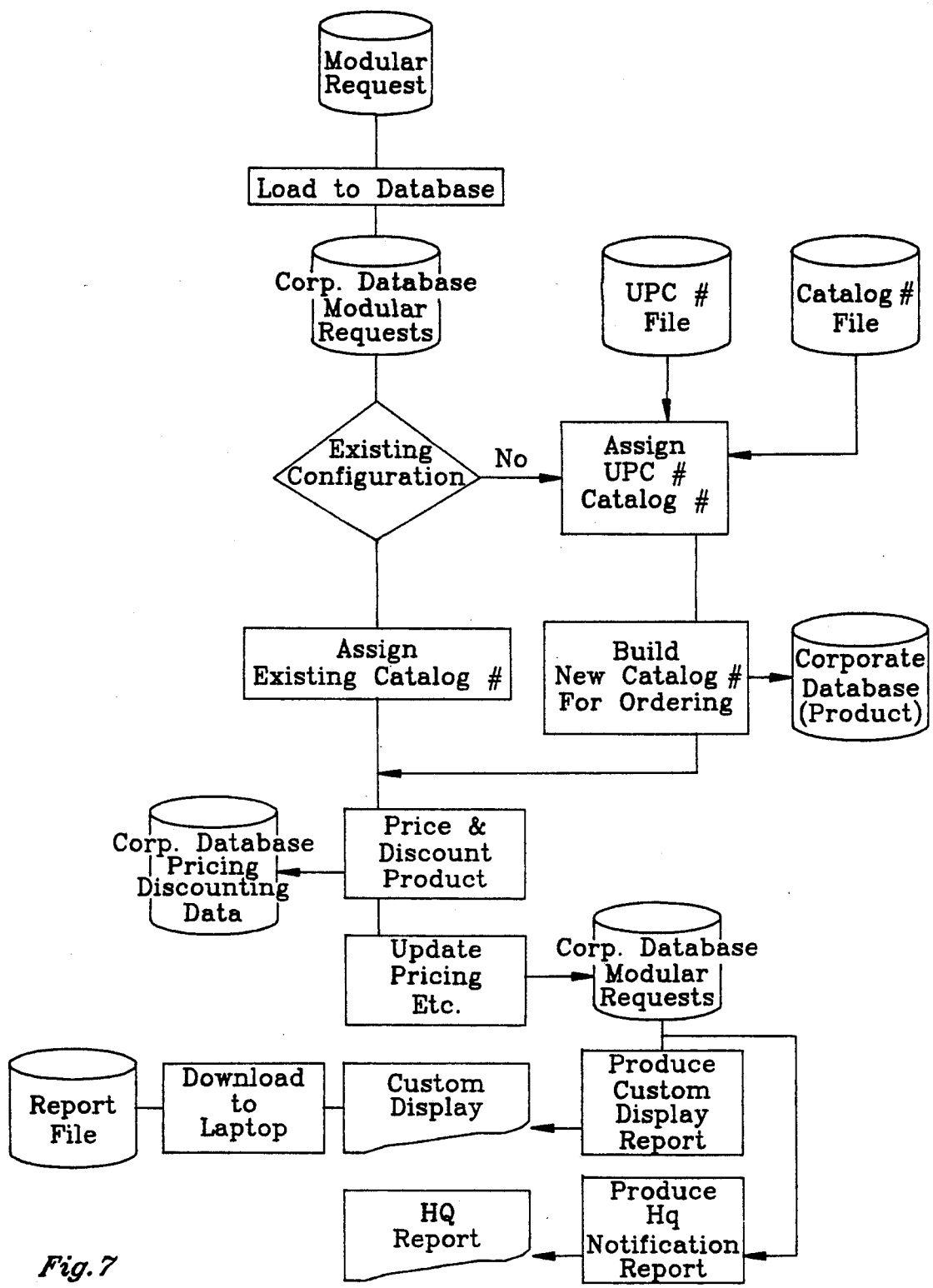
FIG. 7 is a flow chart illustrating the method steps of the present invention accomplished in the corporate mainframe.

The request will then be in a form by which it may be transmitted at the end of the salesperson's day, for instance, by modem connecting the lap-top computer to the mainframe at the corporate MIS headquarters (FIG. 7). The mainframe may factor in any information such as price discounts known by the corporate data base. It will also make records for the corporate data base of the individual order and may customize the computer display as influenced by corporate information. This information will be downloaded the next morning to the salesperson's lap-top for customer confirmation along with any support file information needed as shown in FIG. 6.

In processing the customer's requirements in the third category, or "tier" of order, that is, the customed or tailored order, the operation of the lap-top is somewhat different. As before, the salesperson enters the request. After entry, the computer is given the opportunity to edit the material to indicate the correct number of modules and the expected date of shipment. If, based on the information already in the lap-top, there is an error in entry, for instance, the shipment does not indicate a number of modules divisible by five in the illustration shown in FIG. 2, the computer flashes to the screen a warning that this is not a complete shipment.

There is then an opportunity for the salesperson to correct the number of items ordered and reprocess the information to see if an error remains. Eventually the correct number of modules will be arrived at along with the correct merchandising or display paraphernalia including such things as the base B and the header H. A module may be devoted to a merchandising display or premium item. The computer goes on then to calculate the number of modules and packs, percent of packs for each item, the prices and weights, etc. Overweight for a given carrier may be flagged. The results are displayed on the lap-top and approved by the customer.

At the end of the day, the salesperson plugs his lap-top into a modem and the information concerning the order is relayed to the mainframe (FIG. 7). As before, the information received by the mainframe is processed. If there is determined that the configuration has never been ordered before, a Universal Product Code number is applied to the new shipment, as well as a new catalog number. This information is transmitted to the corporate data base. Subsequently, corporate data base information, such as discount price, is entered into the factoring along with new updating of the pricing.

The thus amended information is placed in the corporate data base and information relating to any custom displays is incorporated. All of this is downloaded the next morning by a modem to the salesperson's lap-top for his report file and final confirmation by the customer.

The notable intricacies of the process very generally described, but disclosed by flow charts (FIGS. 6 and 7), relate, then, to tier three orders in which the lap-top computer is given the opportunity to signal an error if, for instance, the correct number of modules is not ordered. In addition, of course, there is the step in the mainframe process in which, if the order does not correspond to an existing configuration, a new UPC and catalog number are assigned to it and reported in the corporate data base.

Thus, steps in the process involving the computer and mainframe are aimed at the proper functioning of a concept of using prepacked modules to comprise a complete order so that the individual assemblies will consist of the proper number of modules to fill the tray and there will be no modules "left over" once the assemblies are complete. The overall target of the entire operation is the ability to be flexible and give the customer what he wants, however odd the configuration, and at the same time operate within the strictures of the prepacked "lowest common denominator" module, increasing efficiency and reducing product handling and waste. Combined with all this is the unique ability of the shipping container; that is, the loaded modules, to double as an attractive display means attracting the eye of the customer and showing him all of the sizes and shapes of product available.

Variations in the invention are possible without departing from the spirit of the invention. Thus, while the invention has been shown in only one embodiment, it is not so limited but is of a scope defined by the following claim language which may be broadened by an extension of the right to exclude others from making or using the invention as is appropriate under the doctrine of equivalents.

What is claimed is:

1. A method of ordering, shipping and merchandising blister card dry cell battery packages of different sizes and numbers of batteries utilizing a plurality of identical open-top box modules each having compartments loaded with given numbers of said packages of different sizes or numbers of batteries, the modules being loaded respectively with packages of all of the different sizes or numbers, and a plurality of identical packing trays, each comprising a bottom wall and an upstanding peripheral side wall, and adapted to snugly receive within its side wall a plurality of selected packing modules in close side-by-side relation, the method including the steps of:
   1) providing in a computer a data base having information relative to the price and weight of the respective loaded modules and various combinations of loaded modules that would make up a complete order,
   2) entering in the computer a customer's order list of a selected combination of battery packages,
   3) retrieving from the data base pricing and weight information pertinent to said order list and an indication of whether the order contains the proper number of packages so that the trays are full of the prescribed number of packages with no packages left over,
   4) rejecting or reversing improper orders, and upon acceptance of a complete and proper order transmitting the instructions for the complete order to a shipping location, and
   5) filling the order with the modules and trays as indicated in the computer display and transporting it to the customer, where the open-top box modules in their trays are used as a merchandising exhibit to display different dry cell battery packages.

2. The method of claim 1 wherein one of the modules in a tray is left unloaded to accommodate a premium item.

3. A method of ordering, shipping and merchandising goods coming in different sizes, shapes, etc. utilizing a plurality of identical open-top box modules, each module having at least one compartment loaded with a given number of packages of identical goods, different modules being loaded respectively with goods of different sizes, shapes, etc., and a plurality of packing trays, each comprising a bottom wall and an upstanding peripheral side wall, and being adapted to snugly receive within its side wall a plurality of selected modules in close side-by-side relation, the method including the steps of:

1) providing in a computer a data base having information relative to the price and weight of the respective loaded modules and with respect to various combinations of loaded modules that would make up a complete order, 2) entering into the computer a customer's order list of a selected assortment of sizes, shapes, etc. of the goods, 3) retrieving from the data base information concerning pricing and weight information pertinent to said order list and an indication of whether the selected assortment of goods in the customer's order list constitutes a combination of fully loaded modules and therefore a complete order, 4) rejecting or revising improper orders and transmitting the instructions for complete orders to a shipping location, and 5) filling the order at the shipping location with the modules and trays indicated in the computer display and transporting it to the customer.

4. The method of claim 3 wherein the distance across an end of each of the modules is twice the distance along a side and each module present two compartments of equal size defined partly by a partition extending across the module at the midpoint thereof whereby the module contains a relatively small number of packages, whereby the possible combinations of different sizes and numbers of batteries versus the amount of material required in making the modules is optimized.

5. The method of claim 3 wherein each tray holds five of said modules.

6. The method of claim 3 wherein if the weight exceeds the maximum limit for a selected carrier, the computer will so indicate.

7. The method of claim 3 wherein the computer comprises a lap-top computer and a remote mainframe and the lap-top and the mainframe communicate through modem means.

8. The method of claim 3 wherein if the configuration of the order is new with respect to configurations in the data base of the computer, the computer will assign a new catalog number and UPC number to that configuration.

9. The method of claim 3 wherein, after the order is received by the customer and open-top box modules in their trays are used as a merchandising exhibit to display the packages of different goods.

* * * * *